Figure 1:
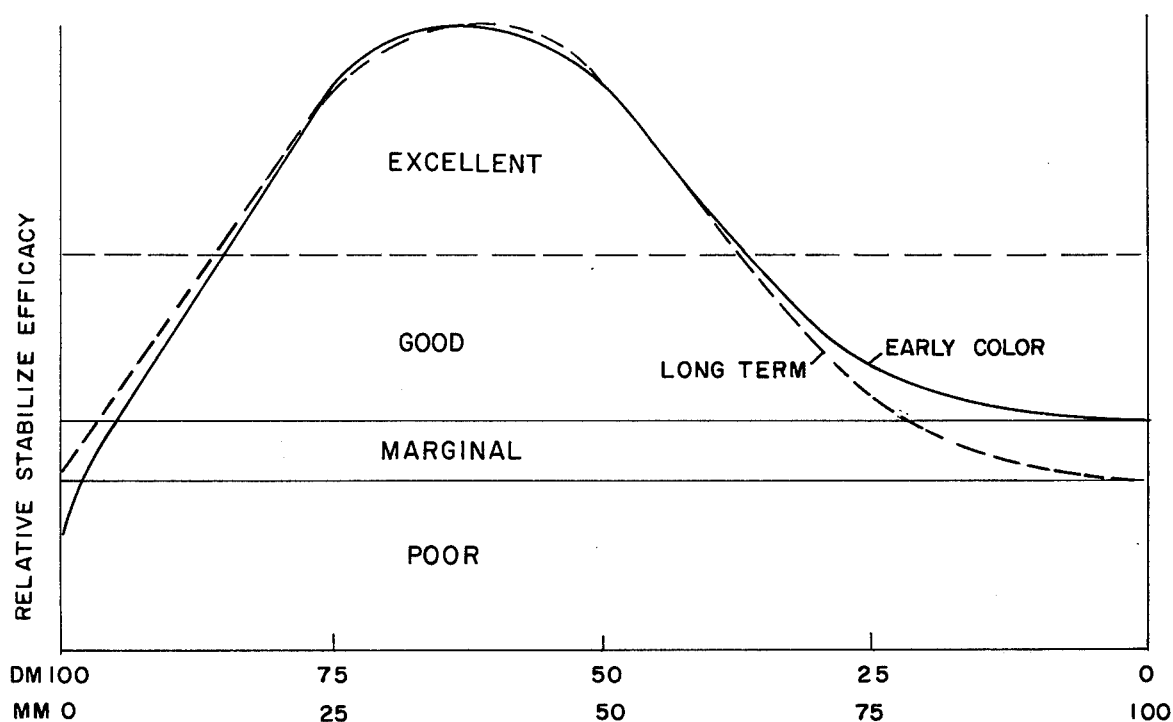

United States Patent [19]

Weisfeld

[11] 4,008,201

[45] * Feb. 15, 1977

[54] HALOGENATED RESINS STABILIZED WITH NOVEL COMPOSITIONS

[75] Inventor: Lewis B. Weisfeld, Princeton, N.J.

[73] Assignee: Carlisle Chemical Works, Inc., Reading, Ohio

[ * ] Notice: The portion of the term of this patent subsequent to Feb. 8, 1989, has been disclaimed.

[22] Filed: July 18, 1975

[21] Appl. No.: 597,233

Related U.S. Application Data

[63] Continuation of Ser. No. 223,623, Feb. 4, 1972, abandoned. Continuation-in-part of Ser. No. 803,084, Feb. 27, 1968, Pat. No. 3,640,950, which is a continuation-in-part of Ser. No. 577,844, Sept. 8, 1966, abandoned.

[52] U.S. Cl. .......................................... 260/45.75 S
[51] Int. Cl.² .......................................... C08K 5/58
[58] Field of Search ............................. 260/45.75 S

[56] References Cited

UNITED STATES PATENTS 3,640,950   2/1972   Weisfeld ...................... 260/45.75 S Primary Examiner—V.P. Hoke
Attorney, Agent, or Firm—Cushman, Darby & Cushman

[57] ABSTRACT

The early color stability of halogenated resins stabilized with diorganotin mercapto compounds, preferably dimethyl, is improved by including a minor amount of monohydrocarbyltin derivatives, preferably monomethyl, therewith. This combination also frequently reduces processing and finish odors associated with mercapto stabilizers and improves long term stability and/or processability.

16 Claims, 2 Drawing Figures

HALOGENATED RESINS STABILIZED WITH NOVEL COMPOSITIONS

This is a continuation of application Ser. No. 223,623, filed Feb. 4, 1972.

This application is a continuation-in-part of my application Ser. No. 803,084 filed Feb. 27, 1968, now U.S. Pat. No. 3,640,950, which is a continuation-in-part of my application Ser. No. 577,844 filed Sept. 8, 1966, now abandoned.

This invention relates to halogenated resin compositions stabilized with organotin mercapto compounds. More particularly, this invention relates to a combination of a dialkyltin mercapto compound and a monohydrocarbyltin compound to stabilize halogenated resins with improved early color properties and often a reduction of processing and finished odors.

Diorganotin mercapto compounds have gained acceptance as useful stabilizers for halogenated resins. Their use has been extended by so called hidden benefits in addition to their stabilizing properties. These hidden benefits include such things as permitting longer, uninterrupted extrusion runs with less down time needed for cleaning and changing of screen packs. Also, these stabilizers often demonstrate a slight though significant increase in the output rate of high quality extrusions. However, halogenated resin formulations stabilized with diorganotin mercapto compounds sometime exhibit an undesirable yellowish cast and an unpleasant odor is developed during processing. The unpleasant odor, in addition, frequently remains noticeable in the finished product. The characteristic yellow color and unpleasant odor present in diorganotin mercapto compound stabilized halogenated resins has limited expansion of the use of these resins to new applications.

I have discovered that the yellowish cast characteristic of diorganotin mercapto compound stabilized halogenated resins can be substantially eliminated by including small amounts of monohydrocarbyltin compounds in the resin formulations. This combination often has the additional advantage of substantially eliminating the unpleasant odors released during processing of such resin formulations as well as the residual odor heretofore found in the finished product. The additional advantage is particularly noticeable when at least one tin-oxygen bond is present in the monohydrocarbyltin compound.

The diorganotin mercapto compounds, particularly the dialkyltin mercapto compounds, which have found wide acceptance as stabilizer compositions include the reaction products of mercapto acids, mercapto esters and mercaptans with diorganotin compounds. For example, products defined by the formulae

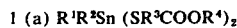

1 (a) $R^1R^2Sn(SR^3COOR^4)_2$

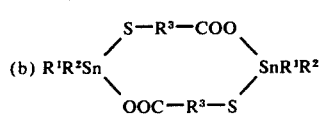

(b) $R^1R^2Sn\begin{matrix}S-R^3-COO\\OOC-R^3-S\end{matrix}SnR^1R^2$

(c) $R^1R^2Sn(SR^4)_2$ wherein $R^1$ and $R^2$ are monovalent alkyl, aryl, aralkyl, alkaryl, or cycloalkyl radicals, $R^3$ is a substituted or unsubstituted alkylene, arylene, aralkylene, alkarylene or cycloalkylidene and $R^4$ represents hydrogen or monovalent alkyl, aryl, aralkyl, alkaryl or cycloalkyl are well known. The preferred dialkyltin mercapto compounds are the dimethyltin members of the class defined above. Compounds of the formula 1(a) may be prepared, for example, by the reaction of 1 mole of a diorganotin oxide with 2 moles of a mercapto ester. The reaction of equal molar amounts of a diorganotin oxide and a mercapto acid will produce compounds corresponding to that of formula 1(b). The reaction of a diorganotin oxide with 2 moles of a mercaptan produces a compound corresponding to that of formula 1(c).

At present, dibutyltin bis (isooctyl acetomercaptide) and dibutyltin bis (dodecyl mercaptide) are probably the most common organotin mercapto stabilizers. They provide very good long-term static heat stability and low melt viscosity which are necessary for the processing of halogen-containing resins and particularly rigid polyvinyl chloride. Other diorganotin mercapto compounds which are suitable include dimethyltin dioctyl mercaptide, dimethyltin bis (2-ethylhexyl mercaptide), dimethyltin didecyl mercaptide, dimethyltin dilauryl mercaptide, dimethyltin distearyl mercaptide, dimethyltin diphenyl mercaptide, dimethyltin dinaphthyl mercaptide, dimethyltin dibenzyl mercaptide, dimethyltin bis (2-phenyl ethyl mercaptide), dimethyltin ditolyl mercaptide, dimethyltin dicyclohexyl mercaptide, dimethyltin bis (butyl mercaptoacetate), dimethyltin bis (cyclohexyl mercaptoacetate), dimethyltin bis (octyl mercaptoacetate), dimethyltin bis (isooctyl mercaptoacetate), dimethyltin bis (2-ethylhexyl mercaptoacetate), dimethyltin bis (decyl mercaptoacetate), dimethyltin bis (lauryl mercaptoacetate), dimethyltin bis (stearyl mercaptoacetate), dimethyltin bis (butyl β-mercaptopropionate), dimethyltin bis (cyclohexyl β-mercaptopropionate), dimethyltin bis (octyl β-mercaptopropionate), dimethyltin bis (isooctyl β-mercaptopropionate), dimethyltin bis (2-ethylhexyl β-mercaptopropionate), dimethyltin bis (decyl β-mercaptopropionate), dimethyltin bis (lauryl β-mercaptopropionate), dimethyltin bis (stearyl β-mercaptopropionate), dibutyltin bis (isooctyl β-mercaptopropionate) and dioctyltin bis (isooctyl mercaptopropionate). Additional examples of suitable diorgano tin mercapto compounds which may be used for stabilizing halogen-containing resin compositions and practicing the present invention are taught by U.S. Pat. Nos. 2,809,956, 2,998,441 and 3,027,350 all to Mack et al. as well as U.S. Pat. No. 3,167,527 to Hechenbleikner and U.S. Pat. No. 3,183,238 to Barbanson.

The monoorganotin compounds suitable for practicing the present invention correspond to the formula

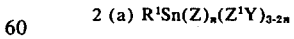

2 (a) $R^1Sn(Z)_n(Z^1Y)_{3-2n}$ wherein $R^1$ has the same meaning as above, Z and $Z^1$ are each oxygen or sulfur, $n$ is 0 to 1.5 and Y is hydrogen or a monovalent organic rest.

Examples of organic rests suitable include alkyl, aralkyl, alkaryl, aryl, alkenyl, or cycloalkyl groups, carboxylic esters, such as —$R^3COOR^4$, carbonyl containing groups such as

and sulfur containing groups

wherein $R^3$ is alkylene, alkenylene, cycloalkylidene, arylene, alkarylene and aralkylene, $R^4$ is hydrogen, alkyl or cycloalkyl, $R^5$ is alkylene, cycloalkylidene, alkylidene, alkenylene or alkenylidene and $R^6$ is $R^4$ or $—R^3COOR^4$. Since the essential of these compounds is the mono-hydrocarbyl radical attached to the tin, many different organic rests may be used as Y.

When Z and $Z^1$ are both oxygen, $n$ is one and Y is $R^4$, the compounds are hydrocarbyl stannoic acids or esters thereof represented by the formula:

(b) $R^1SnOOR^4$ wherein $R^4$ is hydrogen or alkyl. Examples of suitable compounds included within this formula when $R^4$ is hydrogen, are methyl stannoic acid, butyl stannoic acid, n-octyl stannoic acid, isooctyl stannoic acid and phenyl stannoic acid. Z and $Z^1$ may be sulfur and suitable compounds include the thiostannoic acids such as methyl thiostannoic acid, butyl thiostannoic acid, n-octyl thiostannoic acid, isooctyl thiostannoic acid and phenyl thiostannoic acid. When $n$ is 1.5, the acids and/or thioacids correspond in part to the following formula:

(c) $[R^1SnZ]_2Z$

These compounds are, for example, the dehydrated or desulfhydrated forms of the corresponding acids. Also, the monohydrocarbyltin compounds suitable for practicing the present invention may be mixtures of compounds represented by formulae 2(b) and (c) such as when dehydration or desulfhydration is not complete. When $R^4$ is a hydrocarbon in formula 2(b) the compounds are esters. Preferably, the $R^4$ hydrocarbons are alkyl groups having 1 to 12 carbon atoms such as the methyl, butyl, n-octyl and isooctyl esters of the above-listed acids and thioacids.

When $Z^1$ is sulfur, Y is a carboxylic ester, such as $R^3COOR^4$ and $n$ is zero, the compounds correspond to the formula:

(d) $R^1Sn(SR^3COOR^4)_3$

Examples of compounds corresponding to this formula which are suitable for practicing the present invention include monobutyltin tris (isooctylmercaptopropionate) and monobutyltin tris (isooctylthioglycolate).

When $Z^1$ is sulfur, Y is $R^3COOR^4$ and $n$ is ½, the compounds correspond to the formula:

(e) $[R^1Sn(SR^3COOR^4)_2]Z$

Examples of compounds suitable for practicing the present invention corresponding to this formula are bis (monobutyltin isooctyl mercaptopropionate) oxide or sulfide and bis (monobutyltin isooctylmeraptobutyrate) oxide or sulfide. Also, if $n$ is changed to 1 the compounds of 2(e) become polymeric and have repeat units corresponding to the formula:

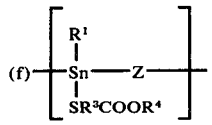

When $R^4$ in formula 2(b) is hydrogen, the compounds represented by formula 2(b) frequently exist in the form of polymers which are the condensation products of the respective stannoic and thiostannoic acids and mixtures thereof. These condensation products may contain 2 to 1,000 repeat units and generally contain 2 to 100 repeat units corresponding to the formula:

(g) $[R^1SnZ_{1.5}]_y$ wherein Z is oxygen, sulfur or a mixture of oxygen and sulfur and $y$ denotes the degree of polymerization. Furthermore, other monobutyltin compounds also exist polymerically. One example is poly [butylstannoxy cyclohexylidene bis (thiodipropionate)].

Examples of compounds containing a carbonyl group in the Y-organic rest bonded to $Z^1$ are monobutyltin tris [butyrate], bis [monobutyltin dibutyrate] oxide or sulfide and monobutyltin tris [cyclohexylidene bis (thiopropionic acid) monobutyl ester]. The latter compound is also exemplary of sulfur containing organic rests. Also unsaturated organic rests such as those containing $$—\overset{O}{\underset{\|}{C}}—CH=CHC\overset{O}{\underset{\|}{—}}OR^4,$$

are useful. Suitable compounds containing unsaturated organic rests are monobutyltin tris (butylmaleate) and bis [monobutyltin di(monobutyl maleate)] oxide or sulfide.

One group of preferred monohydrocarbyltin compounds are those corresponding to one of the formulae 2(h) $CH_3Sn(Z'Y)_3$ or 2(i) $\left[\begin{array}{c} Z'Y' \\ | \\ CH_3Sn \\ | \\ Z'Y' \end{array}\right]_2 Z$ wherein Z and Z' are as herebefore defined; Y is a monovalent, organic moiety and Y' is R' when Z' is oxygen or $$—\overset{O}{\underset{\|}{C}}—R^3—S—R^3—\overset{O}{\underset{\|}{C}}—OR'$$

when Z' is oxygen or sulfur. I have discovered that synergism is independent of the nature of the monovalent organic moiety, Y, when the atom bonded to Z' is a carbon; the radical is compatible with halogen containing resin compositions and their conventional ingredients; and the monohydrocarbyltin compound is stable. Generally, the moiety contains up to 20 carbon atoms and preferably at least 4 carbons.

Examples of several classes of compounds corresponding to this preferred group of monomethyltin compounds are:

A. Carboxylates having a formula of

such as methyltin tris acetate, methyltin tris butyrate, methyltin tris (2-ethylhexanoate), methyltin tris octanoate, methyltin tris laurate, methyltin tris stearate, methyltin tris hexahydrobenzoate, methyltin tris benzoate, methyltin tris (p-methyl benzoate), methyltin tris (2-phenylacetate) and methyltin tris naphthoate;

B. Alcoholates having a formula of $CH_3Sn(OR')_3$, such as methyltin tris methylate, methyltin tris ethylate, methyltin tris butylate, methyltin tris (2-ethylhexylate), methyltin tris octylate, methyltin tris laurylate, methyltin tris stearylate, methyltin tris cyclohexylate, methyltin tris phenate, methyltin tris benzylate, methyltin tris naphthylate and methyltin tris (p-methylphenate);

C. Mercaptides having a formula of $CH_3Sn(SR')$ such as methyltin tris methylmercaptide, methyltin tris ethylmercaptide, methyltin tris butylmercaptide, methyltin tris (2-ethylhexylmercaptide), methyltin tris octylmercaptide, methyltin tris laurylmercaptide, methyltin tris stearylmercaptide, methyltin tris cyclohexylmercaptide, methyltin tris phenylmercaptide, methyltin tris benzylmercaptide and methyltin tris naphthyl mercaptide;

D. Dicarboxylate monoesters having a formula of

wherein R° is an alkylene, such as ethylene, propylene, butylene and arylene, such as phenylene, alkenylene, such as ethenylene, propenylene and 2-pentenylene, cycloalkylidene such as cyclopentylidene and cyclohexylidene or sulfur interrupted alkylene such as thiodiethylene, 1,1-cyclopentylidene bis (mercaptoethylene) and compounds represented by the formula include methyltin tris (monobutylsuccinate), methyltin tris (monoisooctyladipate), methyltin tris (monomethylmaleate), methyltin tris (monobutylmaleate), methyltin tris (monoisooctylmaleate), methyltin tris (monostearylmaleate), methyltin tris (monobutylglutaconate), methyltin tris (monoisooctyl thiodipropionate) and methyltin tris [monobutyl-1,1-cyclopentylidene-bis (mercaptopropionate)];

E. Mercaptoacid esters having a formula of

such as, methyltin tris (butyl mercaptoacetate), methyltin tris (isooctylmercaptoacetate), methyltin tris (methyl mercaptopropionate), methyltin tris (butyl mercaptopropionate), methyltin tris (octyl mercaptopropionate), methyltin tris (lauryl mercaptopropionate), methyltin tris (stearyl mercaptopropionate), methyltin tris (phenyl mercaptopropionate), methyltin tris (benzyl mercaptopropionate), methyltin tris (cyclohexyl mercaptopropionate), methyltin tris (butyl mercaptobutyrate), and methyltin tris (butyl-p-mercaptobenzoate); and F. Bis oxides having a formula of

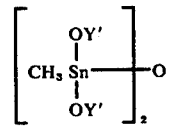

such as, bis (methyltin dimethylate) oxide, bis (methyltin dibutylate) oxide, bis (methyltin dicyclohexylate) oxide, bis (methyltin diphenate) oxide and bis [methyltin di (isooctylthiodipropionate)] oxide.

The combination of compounds of the type corresponding to formula 1(a–c), particularly when $R^1$ and $R^2$ are methyl, with those corresponding to the formula 2(a–i), particularly 2 (h and i), may be substituted with advantage in all applications where compounds corresponding to the formula 1(a–c) have been heretofore employed. The combination of the present invention is particularly useful for improved halogen-containing resin compositions. The improvement of the present invention has found special application in the processing of vinyl halide polymers, such as, polyvinyl chloride, copolymers of polyvinyl chloride with other ethylenically unsaturated compounds as well as other halogen-containing resins. The combination of the present invention may be used alone or further combined with other stabilizers such as epoxy compounds and/or organic phosphites.

The monohydrocarbyltin compounds of the present invention are incorporated into the resin compositions in amounts such that about 0.1 to 98 weight percent of the tin metal is present in the form of the monohydrocarbyltin compound. Generally, 0.5 to 25 weight percent (tin metal/total tin content) of the monohydrocarbyltin compound is sufficient to eliminate the yellowish cast produced in halogen-containing resins by dialkyltin mercapto stabilizers. The total amount of dialkyltin mercapto compound and monohydrocarbyltin compound used to stabilize halogen-containing resins usually ranges from about 0.2 to 10 weight percent of the resin and amounts of 0.5 to 2 weight percent are generally preferred.

The following examples are presented to illustrate the present invention and are not to be construed as limiting the scope thereof.

EXAMPLE 1

1 g of butylstannoic acid was added to 100 g of dibutyltin bis (isooctyl acetomercaptide), and the mixture was heated to 120° C. so as to dissolve the butylstannoic acid. Thereby, no substantial change of the physical properties of the dibutyltin compound was observed.

Two parts of said mixture were milled at 320° F for 5 minutes on a two-roll mill with 120 parts of rigid polyvinyl chloride homopolymer and 0.25 parts of mineral oil, and then press polished at the same temperature for 5 minutes into 20 mil sheets.

The obtained sheets were water-white and clear. Samples prepared in exactly the same manner with 2 parts of the dibutyltin bis (isooctyl acetomercaptide) only without the butylstannoic acid were also clear but had a distinct yellowish hue.

EXAMPLE 2

10 g of bis (monobutyltin isooctyl mercaptopropionate) oxide were added to 100 g of dibutyltin bis (isooctyl acetomercaptide) to form a homogeneous mixture. When two parts of this mixture were milled into 100 parts of a vinyl chloride resin, which consisted of the copolymer of 85 percent by weight of vinyl chloride with 15 percent by weight of vinyl acetate and contained, in addition, 0.25 parts of mineral oil under the conditions described in Example 1, the sheets were clear and practically colorless.

In addition, no unpleasant odor of mercapto acid was noticed on hot milling, and samples of thus obtained sheets were stored in closed jars appeared odorless compared to the unpleasant smell presented by the sheets stabilized with the dibutyltin compound alone.

If two parts of the dibutyltin bis (isooctyl acetomercaptide) were used alone, omitting the monobutyltin compound, a significantly greater initial yellowness was observed. This difference is especially pronounced when the quantities of respective tin stabilizer compositions were reduced to a total of one part per hundred parts resin.

EXAMPLE 3

1.0 parts of dibutyltin mercaptopropionate and 0.2 parts of bis (monobutyltin isooctyl mercaptopropionate) oxide were hot milled with 0.25 parts of mineral oil into 100 parts of poly(vinyl chloride) homopolymer. No objectional mercapto acid odor was noticed.

When instead of the above mixture, 1.1 parts of the dibutyltin mercaptopropionate itself only were used, a very disagreeable odor was developed.

The (bis monobutyltin isooctylmercaptopropionate) oxide used in the examples was prepared as follows:

208.7 g (1.0 moles) of butylstannoic acid and 250 ml of toluene were charged to a three-neck flask and dehydrated via azeotropic distillation at 120° C. under atmospheric pressure.

436.8 g (2.0 moles) of isooctyl beta mercaptopropionate were added to the thus obtained product, and the reaction mixture was stripped by heating first for 30 minutes at a temperature of 120° C. and a pressure of 90 mm Hg and then for additional 30 minutes at 155° C. and 15 mm Hg.

A clear, slightly viscous straw-colored liquid was obtained, containing 18.0% Sn, and having the empirical formula

$$[C_4H_9Sn(SCH_2CH_2\overset{O}{\overset{\|}{C}}OC_8H_{17})_2]_2O.$$

EXAMPLE 4

The procedure of Example 1 was followed except dimethyltin bis (isooctyl acetomercaptide) was substituted for the dibutyltin bis (isooctyl acetomercaptide). As in Example 1, the sheet containing both the monobutyltin and dimethyltin compounds were clear while those containing only the dimethyltin compound had a distinct yellowish hue.

EXAMPLE 5

Samples containing 100 parts of GEON 103EP and 0.5 parts mineral oil were stabilized as follows:

1. 1.00 part dibutyltin bis (isooctyl thioglycolate) (0.18 wt.% Sn) [control sample]
2. 0.97 parts dibutyltin bis (isooctyl thioglycolate) 0.01 parts monobutyl stannoic acid (0.18 wt.% total Sn)
3. 0.62 parts dibutyltin bis (isooctyl thioglycolate) 0.13 parts monobutyltin sulfide (0.18 wt.% total tin)
4. 1.24 parts dioctyltin bis (isooctyl mercaptopropionate) 0.18 wt. % tin) [control sample]
5. 0.98 parts dioctyltin bis(isooctyl mercaptopropionate) 0.07 parts monobutyl stannoic acid (0.18 wt. % total tin)

These samples were milled and placed in an oven at 360° F. for 15 minutes. Samples 2, 3 and 5 remained water white and clear while control samples 1 and 4 developed a distinct yellowish cast.

EXAMPLE 6

Samples containing 100 parts of GEON 103EP and 0.5 parts mineral oil were stabilized with the following:
1. 2.5 parts dibutyltin bis(isooctyl thioglycolate)
2. 2.18 parts dibutyltin bis(isooctyl thioglycolate) 0.39 parts monobutyltin tris(isooctyl thioglycolate)
3. 2.28 parts dibutyltin bis (isooctyl thioglycolate) 0.40 parts monobutyltin tris[cyclohexylidene bis (thiopropionic acid) monobutyl ester]

These samples were milled and placed in an oven at 370° F. for 45 minutes. Control sample 1 developed a distinct yellow hue while samples 2 and 3 stabilized according to the present invention remained water white and clear.

EXAMPLE 7

Samples containing 100 parts GEON 103EP and 0.5 parts mineral oil were stabilized with the following:
1. 2.52 parts dibutyltin bis(lauryl mercaptide)
2. 2.21 parts dibutyltin bis(lauryl mercaptide) 0.39 parts monobutyltin tris(isooctyl thioglycolate)
3. 2.21 parts dibutyltin bis(lauryl mercaptide) 0.39 parts monobutyltin tris[cyclohexylidene bis (thiopropionic acid) monobutyl ester]

These samples were milled and placed in an oven at 370° F. for 15 minutes. Sample 1 developed a distinct yellow hue while samples 2 and 3 stabilized according to the present invention remained water white and clear.

EXAMPLE 8

Samples containing 100 parts GEON 103 EP and 0.5 parts mineral oil were stabilized with the following:
1. 1 part dibutyltin bis(isooctyl thioglycolate)
2. .95 part dibutyltin bis(isooctyl thioglycolate) .05 part phenyl tin tris(isooctyl thioglycolate)
3. .9 part dibutyltin bis(isooctyl thioglycolate) .1 part phenyl tin tris(isooctyl thioglycolate)

These samples were oven heated at 370° F. for 30 minutes at which time sample 1, the control sample, developed a distinct orange cast while samples 2 and 3 stabilized according to the present invention had only a very slight yellow hue.

Synergism is defined as "cooperative action of discrete agencies such that the total effect is greater than the sum of the two effects taken independently" (*Websters New International Dictionary* 2nd Edition, 1950). Proper evaluation of various stabilizer combinations for synergism cannot be based upon a comparison of the individual components at the same level as the combination when the individual components have substantially different stabilizing efficacies. For instance, a two part system having one component (A) with an efficacy ratio twice as good as the efficacy rating of the other component (B) and A and B present in equal weight parts at a 2 part level should be compared with 1.5 parts A and/or 3 parts B. Algebraically, this can be shown as follows:

1 part A + 1 part B = Combination to be tested
0.5 part A = 1 part B
1 part A + 0.5 part A = Sum of effects taken independently or 2 parts B = 1 part A
2 parts B + 1 part B = Sum of effects taken independently.

Figure 2:
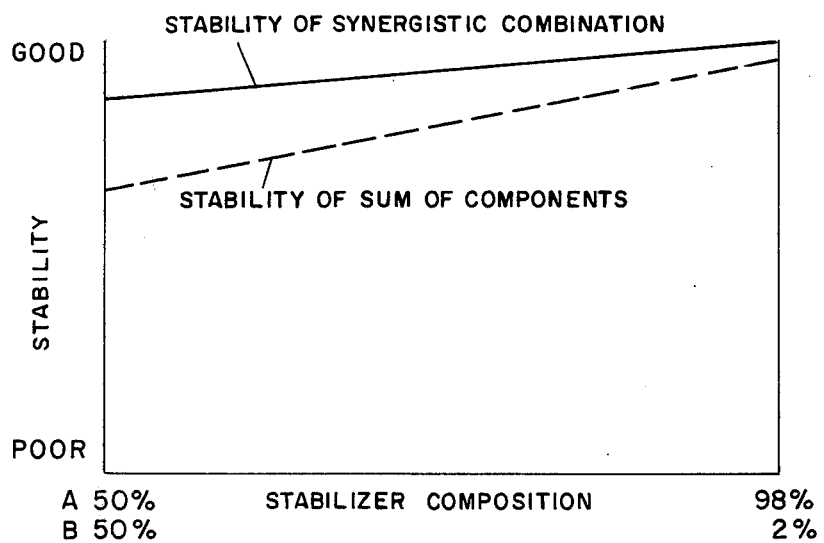

The results of a synergistic test for a range of 98 to 50% A and 2 to 50% B could be represented graphically as shown in FIG. 2. This evaluation procedure is the type which must be applied to the combinations of the present invention.

One demonstration of synergism evaluated by the procedure set forth hereinabove is illustrated by the following:

All tests are conducted using a resin master batch containing 100 parts polyvinyl chloride homopolymer, 3.0 parts acrylic processing aid, 10.0 parts of an acrylate impact modifier, 0.5 part glyceryl monostearate and 0.2 parts blue toner. All samples are milled for 5 minutes at 320° F. on a two roll mill to blend in the respective stabilizer(s). After sheeting off, the samples are divided into chips and placed in a hot air circulating oven. One chip of each sample is removed from the oven at regular five minute intervals for a total exposure of one hour. The chips are then visually compared. Evaluation of a sample stabilized with 2 parts dimethyltin bis (isooctyl mercaptoacetate) (A) and a sample stabilized with 2.0 part monomethyltin tris (isooctyl mercaptoacetate) (B) are compared. The sample stabilized (A) has a slight yellow color after the 10 minute sample is removed from the oven and the sample stabilized with (B) has a slight yellow color after the 30 minute sample is removed from the oven. Repeating the test of the sample stabilized with (B) shows that 0.67 part (B) affords the same stabilizing efficacy as 2 parts (A) [0.33 part (B) = 1.0 part (A)]. A sample containing 2 parts of a combination having 1.0 part (A) and 1.0 part (B) is compared with a sample having 1.33 parts (B) [1.0 part (B) + 0.33 part (B) = 1.33 parts (B)] to show that effect of the combination of components is greater than the sum of the effects of the individual components. The 35 minute chip of the combination of (A) and (B) is clear while the 20 minute chip of the sample containing 1.33 parts (B) is slightly yellow and the 35 minute chip is definitely yellow. Another sample tested having 3 parts (A) shows the same stability efficacy as a sample tested having 1.0 part (B). By comparing the test results of a sample having 4.0 parts (A) with the test results of the combination containing 1 part (A) and 1 part (B) synergism is confirmed by a slight yellow color in the 15 minute piece containing 4 parts (A).

EXAMPLE 9

A masterbatch formulation was prepared from 100.0 parts of a medium molecular weight polyvinyl chloride homopolymer, 10.0 parts of an acrylate-type impact modifier, 3.0 parts of an acrylic processing aid, 0.5 parts of glyceryl monostearate, and 0.02 parts of a blue toner. This is a typical rigid PVC bottle formulation, less the stabilizer. The masterbatch was then divided into eight portions and each portion was stabilized by addition (mixing with) of 2.0 parts of dimethyltin bis (isooctylmercaptoacetate) alone, 2.0 parts of monomethyltin tris (isooctylmercaptoacetate) alone, or 2.0 parts of a mixture thereof having a weight ratio corresponding to 98:2, 95:5, 75:25, 50:50, 25:75, or 2:98, respectively. Each portion was then milled for 5 minutes at 320° on a two-roll mill and sheeted off. The respective sheets were divided into samples and placed in a hot air circulating oven at 375° F. During a period of one hour, one sample of each portion was removed from the oven every 5 minutes. The oven-aged samples were cut to size and affixed to a chart, comparing stabilizer efficacy. FIG. 1 graphically presents the test results.

EXAMPLE 10

Using a master batch consisting of 100 parts of a polyvinyl chloride homopolymer, 10 parts MBS impact modifier, 3 parts of an acrylate processing aid, 0.02 parts blue toner and 0.6 parts wax, a series of tests were run all having a total tin concentration of approximately 360 mg tin per 100 g resin. In each sample a portion of the master batch was blended with the stabilizer by milling for 5 minutes on a two roll mill at 350° F and sheeted off. Chips were cut from the sheet and placed in a hot air circulating oven at 400° F. A piece of each formulation was removed at every 5 minute interval and examined for color development. The series of tests were conducted using dimethyltin bis (isooctyl mercaptoacetate) as the dimethyltin component and methyltin tris (isooctyl mercaptoacetate) as the monomethyltin component in combinations and each of the respective stabilizers in a sample at the 100 percent level. The results of the series of tests are reported in the table:

TABLE I

| Sample | Stabilizer | | % of Resin | Mg Sn/ 100 g PVC | Time to yellow | Time to Black |
|---|---|---|---|---|---|---|
| | MMT* | DMT** | | | | |
| 1 | 0 | 100 | 1.75 | 361 | 10' | 35' |
| 2 | 5 | 95 | 1.75 | 358 | 15' | 35'(brown) |
| 3 | 10 | 90 | 1.80 | 362 | 20' | 40' |
| 4 | 15 | 85 | 1.80 | 358 | 20' | 40' |
| 5 | 25 | 75 | 1.85 | 359 | 25' | 40' |
| 6 | 50 | 50 | 2.00 | 366 | 25' | 40' |
| 7 | 100 | 0 | 2.25 | 360 | 15' | 30' |

*Monomethyltin component
**Dimethyltin component

EXAMPLE 11

Using a master batch consisting of 100 parts of a PVC homopolymer, 10 parts MBS impact modifier, 3 parts of an acrylate processing aid, 0.02 parts blue toner and 0.6 parts wax, a series of plastograph tests were conducted on samples containing approximately 360 mg of tin. With the exception of the comparison example which contained 100 percent dimethyltin bis (isooctylmercaptoacetate) and 100 percent monomethyltin tris (isooctylmercaptoacetate), the remaining examples were within the scope of the invention and demonstrate the improvement of processability of resins formulated using the stabilizers of the present invention. The test was conducted by blending each sample of the master batch and stabilizer in a 2JSS Henschel mixer, transferring 60 g of the sample to a Brabender plastograph and sheering at 50 rpm and 205° C. This type of dynamic testing is used to evaluate extrusion processing. High out-put rates are indicated by low minimum torques and time to decomposition (cross linking) shows relative stability. Low minimum torque and long times to decomposition are desirable.

The following table reports the results of tests and identifies the amount of each stabilizer component and total amount of stabilizer used in each test.

EXAMPLE 12

Using 100 parts PVC homopolymer, 10 parts impact modifier, 3 parts of an acrylate processing aid, 0.5 parts wax, 0.5 parts glyceryl monostearate and 0.02 parts blue toner, a master batch was prepared and a series of samples tested each containing 350 mg of tin. The series of tests was conducted by milling each sample on a 2 roll mill at 320° F for 5 minutes and sheeting off. The sheets were divided into chips which were then placed in a hot air circulating oven at 375° F. One chip of each sample was removed at regular 5 minute intervals for 55 minutes. The samples tested used 1.70 parts dimethyltin bis (isooctylmercaptoacetate) as one control and 2.35 parts monomethyltin tris (isooctylmercaptoacetate) as the other control. The improvement of the present invention was observed in combinations containing 98% dimethyltin (DMT)/2% monomethyltin (MMT), 1.70 parts; 95% DMT/5% MMT, 1.70 parts; 75% DMT/25% MMT, 1.75 parts; 50% DMT/50% MMT, 1.95 parts; 25% DMT/75% MMT, 2.15 parts and 2% DMT/98% MMT, 2.30 parts, when compared with the equivalent stabilizers used alone.

EXAMPLE 13

Using a master batch consisting of 100 parts of a polyvinyl chloride homopolymer, 10 parts MBS impact modifier, 3 parts of an acrylate processing aid, 0.2 parts blue toner and 1.0 parts wax, a series of tests were run using a total of 2 parts stabilizer per 100 parts resin. In each example, a portion of the master batch was blended with the stabilizer by milling for 5 minutes at 320° F on a 2roll mill and sheeting off. Chips were cut from the sheet and placed in a hot air circulating oven at 375° F. A piece of each formulation was removed from the oven at every 5 minute interval for one hour and examined for color development. The series of tests included a test where the stabilizer was dimethyltin bis (isooctyl mercaptoacetate) alone, monomethyltin tris (butyl mercaptopropionate) alone, and methyltin tris (2-ethylhexanoate) alone and 80/20 combinations of dimethyltin bis (isooctyl mercaptoacetate) with monomethyltin tris (butyl mercaptopropionate) and monomethyltin tris (2-ethylhexanoate), respectively. The following table reports the results of the test with the values given representing the number of 10 minute intervals preceding the development of the color indicated. The values enclosed in the red border represent the values obtained according to the present invention.

TABLE II

| Sample | MMT* | DMT** | % of Resin | Mg Sn/ 100 g PVC | Minimum Torque (meter-grams) | Time to Decomposition (minutes) |
|---|---|---|---|---|---|---|
| 1 | 0 | 100 | 1.75 | 361 | 1675 | 12.5 |
| 2 | 5 | 95 | 1.75 | 358 | 1700 | 13.2 |
| 3 | 10 | 90 | 1.80 | 362 | 1650 | 13.7 |
| 4 | 15 | 85 | 1.80 | 358 | 1650 | 14.5 |
| 5 | 25 | 75 | 1.85 | 359 | 1625 | 14.8 |
| 6 | 50 | 50 | 2.00 | 366 | 1650 | 14.0 |
| 7 | 100 | 0 | 2.25 | 360 | 1675 | 11.0 |

*Monomethyltin component
**Dimethyltin component

TABLE III

| | Alone | | | Dimethyltin bis (isooctyl mercaptoacetate) | | |
|---|---|---|---|---|---|---|
| | A | B | C | A | B | C |
| None | — | — | — | 1 | 2 | — |
| methyltin tris (butyl mercaptopropionate) | 2 | 3 | 4.5 | 3.5 | 4.5 | — |
| methyltin tris (2-ethyl hexanoate | 0 | 1 | 3.5 | 3 | 3.0 | — |

A=1st detectable color
B=definite yellow
C=decomposition
—indicates did not occur during 60 minute test

What is claimed is:
1. A vinyl halide resin composition comprising a resin selected from the group consisting of polyvinyl chloride, polyvinylidene chloride, copolymers of vinyl chloride with other ethylenically unsaturated monomers and copolymers of vinylidene chloride with other ethylenically unsaturated monomers and a stabilizing effective amount of a tin composition comprising in synergistic combination a diorganotin mercapto compound having a formula selected from the group consisting of

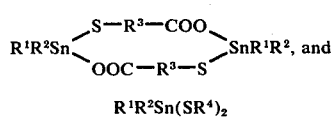

and a monoorganotin compound having the formula $R^1Sn(Z)_n(Z'Y)_{3-2n}$ wherein $R^1$ and $R^2$ are methyl or butyl, Z and Z' are each oxygen or sulfur, n is zero to 1.5 and Y is hydrogen, alkyl, cycloalkyl, $$-R^3COOR^4,$$

$$-\overset{O}{\underset{\parallel}{C}}-R^4,$$

$$-\overset{O}{\underset{\parallel}{C}}-R^3-S-R^5-S-R^3-\overset{O}{\underset{\parallel}{C}}-O-R^4,$$

$$-\overset{O}{\underset{\parallel}{C}}-R^3-S-R^3-\overset{O}{\underset{\parallel}{C}}-O-R^4, \text{ or}$$

$$-\overset{O}{\underset{\parallel}{C}}-R^3-\overset{O}{\underset{\parallel}{C}}-O-R^4$$

wherein $R^3$ is alkylene, alkenylene, cycloalkylidene, cycloalkylene, arylene, alkarylene or aralkylene, $R^4$ is hydrogen, alkyl, aryl, cycloalkyl or aralkyl, $R^5$ is alkylene, cycloalkylidene, alkylidene, alkenylidene or cycloalkylene, said monoorganotin compound being present in amount sufficient to provide tin in amount from 50 to 98 percent by weight of the total tin content of the combination of said diorganotin mercapto compound and said monoorganotin compound.

2. A vinyl halide resin composition according to claim 1 wherein said monoorgano tin compound is a monomethyltin compound.

3. A vinyl halide resin composition according to claim 2 wherein said diorganotin mercapto compound is a dimethyltin mercapto compound and said monomethyltin compound corresponds to a formula selected from the group consisting of $CH_3Sn(Z'Y)_3$ and

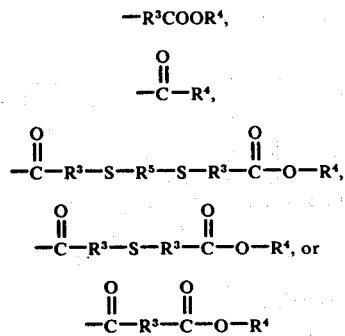

Y' is selected from the group consisting of $R^1$, when Z' is oxygen and $$-\overset{O}{\underset{\parallel}{C}}-R^3-S-R^3-\overset{O}{\underset{\parallel}{C}}-O-R^4$$

when Z' is oxygen or sulfur wherein $R^4$ is a monohydrocarbyl radical selected from the group consisting of alkyl, aralkyl, cycloalkyl, alkaryl and aryl having up to 20 carbon atoms.

4. A vinyl halide resin composition according to claim 3 wherein in the dimethyltin mercapto compound is selected from the group consisting of dimethyltin dioctyl mercaptide, dimethyltin bis (2-ethylhexyl mercaptide), dimethyltin didecyl mercaptide, dimethyltin dilauryl mercaptide, dimethyltin distearyl mercaptide, dimethyltin diphenyl mercaptide, dimethyltin dinaphthyl mercaptide, dimethyltin dibenzyl mercaptide, dimethyltin bis (2-phenylethyl mercaptide), dimethyltin ditolyl mercaptide, dimethyltin dicyclohexyl mercaptide, dimethyltin bis (butyl mercaptoacetate), dimethyltin bis (cyclohexyl mercaptoacetate), dimethyltin bis (octyl mercaptoacetate), dimethyltin bis (isooctyl mercaptoacetate), dimethyltin bis (2-ethylhexyl mercaptoacetate), dimethyltin bis (decyl mercaptoacetate), dimethyltin bis (lauryl mercaptoacetate), dimethyltin bis (stearyl mercaptoacetate), dimethyltin bis (butyl β-mercaptopropionate), dimethyltin bis (cyclohexyl β-mercaptopropionate), dimethyltin bis (octyl β-mercaptopropionate), dimethyltin bis (isooctyl β-mercaptopropionate), dimethyltin bis (2-ethylhexyl β-mercaptopropionate), dimethyltin bis (decyl β-mercaptopropionate), dimethyltin bis (lauryl β-mercaptopropionate), dimethyltin bis (stearyl β-mercaptopropionate).

5. A vinyl halide resin composition according to claim 4 wherein the monomethyltin compound is selected from the group consisting of methyltin tris acetate, methyltin tris butyrate, methyltin tris (2-ethylhexanoate), methyltin tris octanoate, methyltin tris laurate, methyltin tris stearate, methyltin tris hexahydrobenzoate, methyltin tris benzoate, methyltin tris (p-methyl benzoate), methyltin tris (2-phenylacetate), methyltin tris naphthoate, methyltin tris methylate, methyltin tris ethylate, methyltin tris butylate, methyltin tris (2-ethylhexylate), methyltin tris octylate, methyltin tris laurylate, methyltin tris stearylate, methyltin tris cyclohexylate, methyltin tris phenate, methyltin tris benzylate, methyltin tris naphthylate, methyltin tris (p-methylphenate), methyltin tris methylmercaptide, methyltin tris ethylmercaptide, methyltin tris butylmercaptide, methyltin tris (2-ethylhexylmercaptide), methyltin tris octylmercaptide, methyltin tris laurylmercaptide, methyltin tris stearylmercaptide, methyltin tris cyclohexylmercaptide, methyltin tris phenylmercaptide, methyltin tris benzylmercaptide, methyltin tris naphthylmercaptide, methyltin tris (monobutylsuccinate), methyltin tris (monoisooctyladipate), methyltin tris (monomethyl maleate), methyltin tris (monobutyl maleate), methyltin tris (monoisooctyl maleate), methyltin tris (monostearyl maleate), methyltin tris (monobutyl glutaconate), methyltin tris (monoisooctyl thiodipropionate), methyltin tris methyltin tris (butyl mercaptoacetate), methyltin tris (isooctyl mercaptoacetate), methyltin tris (methyl mercaptopropionate), methyltin tris (butyl mercaptopropionate), methyltin tris (octyl mercapto propionate), methyltin tris (lauryl mercaptopropionate), methyltin tris (stearyl mercaptopropionate), methyltin tris (phenyl mercaptopropionate), methyltin tris (benzyl mercaptopropionate), methyltin tris (cyclohexyl mercaptopropionate), methyltin tris (butyl mercaptobutyrate), methyltin tris (butyl-p-mercaptobenzoate), bis (methyltin dimethylate) oxide, bis (methyltin diburylate) oxide, bis (methyltin dicyclohexylate) oxide, (methyltin diphenate) oxide, and bis oxide.

6. A vinyl halide resin composition according to claim 5 wherein the resin is polyvinyl chloride.

7. A vinyl halide resin composition according to claim 5 wherein the stabilizer is present in an amount of about 0.05 to 5 weight percent and said monomethyltin compound contains 50 to 70% of the total tin metal of the tin composition.

8. A vinyl halide resin composition according to claim 7 wherein the dimethyltin mercapto compound is dimethyltin bis (isooctyl mercaptoacetate) and the monomethyltin compound is monomethyltin tris (isooctyl mercaptoacetate).

9. A vinyl halide resin composition according to claim 7 wherein the dimethyltin mercapto compound is dimethyltin bis (isooctyl mercaptoacetate) and the monomethyltin compound is monomethyltin tris (butyl mercaptopropionate).

10. A vinyl halide resin composition according to claim 7 wherein the dimethyltin mercapto compound is dimethyltin bis (isooctyl mercaptoacetate) and the monomethyltin compound is monomethyltin tris (2-ethylhexanoate).

11. A vinyl halide resin composition according to claim 5 wherein the stabilizer is present in an amount of about 0.05 to 5 weight percent.

12. A vinyl halide resin composition according to claim 1 wherein Y is hydrogen, alkyl having 1 to 12 carbon atoms when $n$ is greater than zero,

where $R^4$ is hydrogen or alkyl,

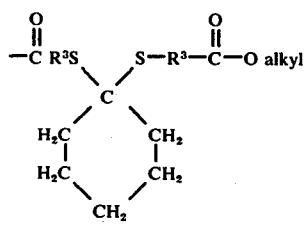

where $R^3$ is alkylene, arylene, aralkylene, alkenylene or cycloalkylidene.

13. A vinyl halide resin composition comprising a resin selected from the group consisting of polyvinyl chloride, polyvinylidene chloride, copolymers of vinyl chloride with other ethylenically unsaturated monomers and copolymers of vinylidene chloride with other ethylenically unsaturated monomers and a stabilizing effective amount of a tin composition comprising in synergistic combination a diorganotin mercapto compound having a formula selected from the group consisting of $R^1R^2Sn(SR^3COOR^4)_2$,

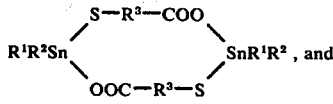

$R^1R^2Sn(SR^4)_2$ and a monoorganotin compound having the formula [$R^1Sn(Z)_n(Z'Y)_{3-2n}$] wherein $R^1$ and $R^2$ are methyl or butyl, Z and Z' are each oxygen or sulfur, $n$ is zero to 1.5 with the proviso that
when $n = 0$, $m = 1$;
when $n = 0.5$, $m = 2$;
when $n = 1$, $m =$ any positive integer up to 1000;
and when $n = 1.5$, $m = 3$ to 1000,
and Y is hydrogen, alkyl, cyclalkyl,

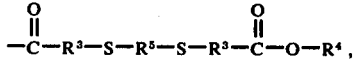

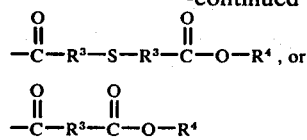

wherein $R^3$ is alkylene, alkenylene, cycloalkylidene, cycloalkylene, arylene, alkarylene or aralkylene, $R^4$ is hydrogen, alkyl, aryl, cycloalkyl or aralkyl, $R^5$ is alkylene, cycloalkylidene, alkylidene, alkenylidene or cycloalkylene, said monoorganotin compound being present in amount sufficient to provide tin in amount from 50 to 98 percent by weight of the total tin content of the combination of said diorganotin mercapto compound and said monoorganotin compound.

14. A vinyl halide resin composition according to claim 1 wherein said monoorganotin compound contains 50 to 75 percent of the total tin metal of the tin composition.

15. A vinyl halide resin composition according to claim 14 wherein the monoorganotin compound contains 50 percent of the total tin metal of the tin composition.

16. A vinyl halide resin composition comprising a resin selected from the group consisting of polyvinyl chloride, polyvinylidene chloride, copolymers of vinyl chloride with other ethylenically unsaturated monomers and copolymers of vinylidene chloride with other ethylenically unsaturated monomers and a stabilizing effective amount of a tin composition comprising in synergistic combination a diorganotin mercapto compound having a formula selected from the group consisting of $R^1R^2Sn(SR^3COOR^4)_2$,

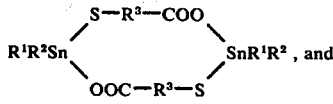

$R^1R^2Sn(SR^4)_2$ and a monoorganotin compound having the formula $R^1Sn(Z)_n(Z'Y)_{3-2n}$ wherein $R^1$ and $R^2$ are methyl or butyl, Z and Z' are each oxygen or sulfur, n is zero to 1.5 and Y is hydrogen, alkyl, cyclalkyl, $-R^3COOR^4$,

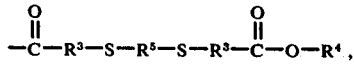

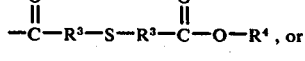

wherein $R^3$ is alkylene, alkenylene, cycloalkylidene, cycloalkylene, arylene, alkarylene or aralkylene, $R^4$ is hydrogen, alkyl, aryl, cycloalkyl or aralkyl, $R^5$ is alkylene, cycloalkylidene, alkylidene, alkenylidene or cycloalkylene, said monoorganotin compound being present in amount sufficient to provide tin in amount from 25 to 98 percent by weight of the total tin content of the combination of said diorganotin mercapto compound and said monoorganotin compound.

* * * * *

UNITED STATES PATENT AND TRADEMARK OFFICE
CERTIFICATE OF CORRECTION

PATENT NO. : 4,008,201
DATED : February 15, 1977
INVENTOR(S) : WEISFELD, Lewis B.

It is certified that error appears in the above–identified patent and that said Letters Patent are hereby corrected as shown below:

Claim 13, Column 15, line 53 change $[R'Sn (Z)_n (Z'Y)_{3-2n}]$ to $[R'Sn (Z)_n (Z'Y)_{3-2n}]_m$ Signed and Sealed this Twenty-fifth Day of March 1980

[SEAL]

Attest:

SIDNEY A. DIAMOND

Attesting Officer     Commissioner of Patents and Trademarks